United States Patent Office 2,871,157
Patented Jan. 27, 1959

2,871,157

LAXATIVE POWDERS CONTAINING DI-n-OCTYL SULFOSUCCINATES

Paul S. Cardaciotto, Trenton, N. J., and Emil A. Vitalis, Springdale, Conn., assignors to American Cyanamid Company, New York, N. Y., a corporation of Maine No Drawing. Application June 6, 1957
Serial No. 663,909

7 Claims. (Cl. 167—56)

This invention relates to laxative compositions in the form of powders suitable for oral administration and containing, as an effective feces softening agent, an alkali metal, ammonium or monoethanolamine salt of di-(normal octyl) sulfosuccinic acid, or a mixture thereof. The invention includes tabletted or capsuled powders containing suitable dosages of the sulfosuccinate laxative for human or animal administration, bulk powdered mixtures containing one or more of the sulfosuccinate salts in admixture with a dry pharmaceutical carrier in the proper ratio for capsulating or compacting into tablets, dry blending methods for preparing such bulk powdered mixtures and also novel methods for producing di-n-octyl sulfosuccinate salts as dry powders, as will hereinafter be more fully described.

Within recent years it has been shown that sodium di-(2-ethylhexyl) sulfosuccinate, which is sold commercially as "Aerosol OT," is an effective agent for relieving constipation of the lower intestinal tract. It acts to relieve congestion by softening the feces but has no spasmodic action on the intestines and is not adsorbed thereby into the body. Our present invention is based on the discovery that the alkali metal, ammonium and monoethanolamine salts of di-(normal octyl) sulfosuccinic acid are also effective feces softening agents and therefore have the same laxative properties as "Aerosol OT" but possess a number of practical advantages thereover. The most important of these advantages are the following.

The water-soluble salts of di-(2-ethylhexyl) sulfosuccinic acid are extremely bitter in taste; furthermore, their bitter taste remains in the mouth for up to 30 minutes after oral ingestion. The corresponding salts of di-(normal octyl) sulfosuccinic acid, on the other hand, have no bitter taste; in fact, when they are purified from residual inorganic salts and organic impurities they are practically tasteless.

The water-soluble salts of di-(2-ethylhexyl) sulfosuccinic acid, in their normal condition, are soft waxes that cannot be dry blended with pharmaceutical carriers such as dicalcium phosphate, calcium carbonate, magnesium carbonate and the like. The corresponding salts of the diester of sulfosuccinic acid with normal octyl alcohol (octanol-1), on the other hand, are friable solids that can be dry blended with such carriers by the methods hereinafter described.

While our invention is not limited to any theoretical explanation, we believe that these and other differences in the essential physical and taste characteristics of the two classes of compounds can be explained on the basis of isomerization. Both sulfosuccinic acid and 2-ethylhexanol contain an asymmetric carbon atom, and therefore the bis-ester of the sulfosuccinic acid with the alcohol can exist as a mixture of a large number of optical isomers. On the other hand, normal octyl alcohol, the chemical formula of which is $CH_3.(CH_2)_6.CH_2OH$, contains no asymmetric carbon atoms and therefore this alcohol forms relatively homogeneous and crystallizable sulfosuccinate bis-ester salts. Regardless of explanation, however, we have established the fact that the water-soluble salts of di-(normal octyl) sulfosuccinic acid can be dry blended with pharmaceutical carriers to form powdered mixtures that are easily tabletted or capsulated, and which are effective and harmless laxatives.

In preparing the compounds used in practicing the invention 2 moles of normal octyl alcohol are esterified with 1 mole of maleic anhydride to form the bis-ester. The esterification is preferably carried out with a 5–10% excess of alcohol over the theoretical amount and in the presence of a small amount of para-toluene sulfonic acid as catalyst. Typical preparation procedures are described in U. S. Patent No. 2,028,091.

The bis-ester is preferably purified by vacuum distillation at pressures of about 0.5–1 mm. of mercury and is then sulfonated by refluxing with an alkali metal, ammonium or monoethanolamine bisulfite in aqueous ethanol. This yields a technical grade of product which ordinarily has a purity of better than 99%, but which contains small amounts of inorganic salts, unreacted octanol, hydrocarbons, ethers and unsulfonated ester. A chemically pure product is therefore preferably obtained by dissolving the technical grade material in methanol and filtering and washing. The following procedure, used for the purification of sodium di-n-octyl sulfosuccinate, is representative.

A 400 gram portion of sodium di-n-octyl sulfosuccinate is dissolved in 800 ml. of anhydrous methanol and filtered through washed (aqueous methanol) diatomaceous earth filter aid. The filter cake is washed with 75 ml. of dry methanol. At least 5 moles (82.5 ml.) of water for each mole of sulfosuccinate is added to the filtrate which is then allowed to stand at 8°–12° C. for 1–2 hours. To this is added with stirring, for each mole of sulfosuccinate, 200 ml. of methanol containing 25 ml. of water, all at 5° C. The mixture is centrifuged in a cloth lined basket cooled to 10°–15° C. and the collected solids are vacuum dried at room temperature.

The purified product so obtained is chilled to a temperature well below 0° C., preferably by storing in a Dry Ice (solid carbon dioxide) compartment and is then mixed with Dry Ice and ground to a fine powder in a motor-driven blade-type grinder. The quantity of Dry Ice added is such as to offset the heat of grinding; in preparing small batches it is about one-third to one-half the weight of the sodium di-(n-octyl) sulfosuccinate whereas a considerably smaller proportion can be used in large scale batches since the weight proportion of the chilled sulfosuccinate to that of the grinder is large. Alkali metal, ammonium and monoethanolamine salts of di-(n-octyl) sulfosuccinic acid prepared and ground by this procedure are dry, free-flowing powders which are well suited for dry mixing with pharmaceutical carriers such as dicalcium phosphate, calcium carbonate, starches and the like.

Purified sulfosuccinates can also be converted into dry, free-flowing powders by spray-drying procedures provided they are first brought into admixture with about 5–15% or more of an alkali metal benzoate such as sodium benzoate. In a typical example 90 parts by weight of the sodium di-(n-octyl) sulfosuccinate, preferably purified as described above, and 10 parts by weight of sodium benzoate are slurried in water to a paste containing 66% solids. This paste is further diluted with water if necessary to obtain a slurry of pumpable consistency and is then pumped into a spray drier and contacted with hot products of combustion having a temperature such that the outlet gas temperature is about 400°–450° F.; this usually requires gas inlet temperatures of about 600°–800° F. depending on the solids content of the feed slurry. The alkali metal, ammonium and monoethanolamine salts of di-(n-octyl) sulfosuccinic acid, when mixed with alkali metal benzoates and spray dried in this manner, form powders which are well suited for blending with dry pharmaceutical carriers by dry mixing procedures.

In preparing the dry mixtures of the invention the proportion of di-n-octyl sulfosuccinate salt to carrier may be varied between wide limits and will depend largely on the dosage desired. It will be understood that for most purposes tablets or capsules containing about 50–200 milligrams of the mixture are sold and these will contain the particular dosage of the sulfosuccinate laxative that is optimum for the patient intended. For humans the optimum dose is from about 10 to 25 milligrams of the sulfosuccinate for children and from about 50 to 100 mg. for adults; for animals it is roughly about 1 mg. for each 3 to 4 lbs. of the animal's weight. In laxative tablets or capsules for small animals such as cats or dogs weighing up to 20–25 lbs. the amount of pharmaceutical carrier may be as much as 25 times the weight of the sulfosuccinate salt, while for large animals the ratio may be as low as 1:1. It is an important advantage of the dry, powdered sulfosuccinate salts used in practicing the invention that they can be dry mixed with any customary or preferred dry pharmaceutical carriers at any desired weight ratio between these limits by standard mixing procedures.

The laxative powders comprising the invention, and defined with greater particularity in the appended claims, fall logically into two closely related categories. These are bulk pharmaceutical powders, intended for tabletting or capsulation by pharmaceutical distributors, and tabletted or capsulated preparations in dosage unit form for the ultimate consumer. The bulk powders are most conveniently produced for tablet preparation by admixture of the powdered alkali metal, ammonium or monoethanolamine salts of di-n-octyl sulfosuccinic acid with tasteful carriers in the form of blank granulations, i. e., with non-bitter pharmaceutical carriers which have been prepared for tabletting by admixture with a binder and converted into a granular condition so that they will feed evenly from the hopper into the dies of an automatic tabletting machine. A typical blank granulation illustrating this procedure is described in Example 1. Bulk mixtures suitable for capsulation are produced by preparing a mixture of the sulfosuccinate salts with one or more dry pharmaceutical carriers and a suitable lubricant such as talc or other similar powdered material having lubricant properties. Representative powder mixes of this type are illustrated in Examples 3 and 4. It will be understood, however, that while the following examples may describe in detail certain compositions constituting preferred embodiments of the invention, they are also to be taken as illustrative of the invention in its broader aspects, modifications and substitutions of equivalent materials being included within the scope of the appended claims.

*Example 1*

Alkali metal, ammonium and monoethanolamine salts of di-(normal octyl) sulfosuccinic acid are tabletted in admixture with tasteful pharmaceutical carriers or fillers, preferably of low density, such as lactose, calcium carbonate, magnesium carbonate, dicalcium phosphate, confectioners' sugar and the like. Granulating agents such as gum tragacanth, gum acacia and other water-soluble gums, sugars such as cane sugar syrup, glucose, corn syrup and starch paste and gelatin are mixed with the carriers in small amounts on the order of 1–10% by weight and function as binders. With such carriers as lactose and confectioners' sugar a small amount of water, ethanol or aqueous ethanol will serve as a binder.

The dicalcium phosphate granulation used in the following formulations is illustrative of such pharmaceutical carriers. Powdered dicalcium phosphate is agitated in a mixer while a water solution of gum acacia is added in quantities such as to introduce 5% of the gum on the weight of the phosphate while converting the mixture into granules. These are screened to about one-sixteenth inch average size and tray dried.

A mixture suitable for compressing into uncoated tablets was prepared from the following ingredients, the quantities being parts by weight:

| | Parts |
|---|---|
| Sodium di-n-octyl sulfosuccinate 90%, Sodium benzoate 10%—Spray dried powder | 2.27 |
| Dicalcium phosphate, white blank granulation | 14.02 |
| Magnesium stearate, U. S. P | 0.17 |

This mixture was rolled for 3 hours in a stainless steel drum containing baffles to promote intimate mixing and assayed. It was then compressed into tablets weighing 165 milligrams on an automatic tabletting machine. No difficulties were experienced in tabletting; the dry mixture fed evenly from the hopper into the dies of the machine and formed smooth tablets of good mechanical strength. One of these tablets, containing 20 milligrams of the laxative, is a normal dose for a child.

Tablets containing 50 milligrams of the sulfosuccinate were prepared from the following formulation:

| | Per Tablet | Per Batch |
|---|---|---|
| | *Grams* | *Grams* |
| Sodium di-n-octyl sulfosuccinate 90%, Sodium benzoate 10%—Spray dried powder | 0.0571 | 142.75 |
| Dicalcium phosphate, white blank granulation | 0.1062 | 265.5 |
| Magnesium stearate, U. S. P | 0.0017 | 4.25 |
| Total | 0.1650 | |

The mixture was rolled as described above and compressed into $\%_{32}$-inch tablets.

The following mixture was used to prepare tablets containing 100 milligrams of sulfosuccinate:

| | Per Tablet | Per Batch |
|---|---|---|
| | *Grams* | *Grams* |
| Sodium di-n-octyl sulfosuccinate 90%, Sodium benzoate 10%—Spray dried powder | 0.1142 | 285.5 |
| Dicalcium phosphate, white blank granulation | 0.2124 | 531.0 |
| Magnesium stearate, U. S. P | 0.0034 | 8.5 |
| Total | 0.3300 | |

The mixing was by rolling as described above; the tablets were $1\%_{32}$-inch in size.

These tablets are practically tasteless, and therefore can be administered in uncoated form. However, if desired, a sugar coating can be applied by any suitable method, as by rolling them in a heated pan containing a sugar syrup.

Tests on both laboratory animals and on human adults showed the 50 milligram and 100 milligram tablets to be effective but harmless feces softening agents.

*Example 2*

Pieces of recrystallized sodium di-n-octyl sulfosuccinate were chilled in a Dry-Ice refrigerating cabinet, mixed with about one-third their weight of Dry Ice and ground in a power-driven blade-type grinder to a free-flowing powder. This was used in making up the following formulations:

| | Grams Per Tablet | Grams Per Batch | Grams Per Tablet | Grams Per Batch |
|---|---|---|---|---|
| Sulfosuccinate (100%) | 0.0204 | 2.08 | 0.0510 | 10.3 |
| Dicalcium phosphate, blank granulation | 0.1429 | 28.58 | 0.1123 | 22.5 |
| Magnesium stearate | 0.0017 | 0.34 | 0.0017 | 0.34 |
| Total Weight | 0.165 | | 0.165 | |

The ingredients were rolled together in jars for 15 minutes and the resulting mixtures were compressed on a tabletting machine. Compression was obtained easily and the tablets were excellent with no pitting or capping.

Example 3

The di-(normal octyl) sulfosuccinate powders of the invention can also be filled into capsules; when administered in this form the powder is more quickly dispersed in the stomach, since it is not compacted, and a more rapid softening action on the feces is obtained in the intestines.

A powder mix for capsules containing 20 mg. of the laxative per 150 mg. dose is prepared by the following formulation:

|  | Grams/Dose | Standard Batch, Grams |
|---|---|---|
| Sodium di-n-octyl sulfosuccinate 90%, Sodium benzoate 10%—Spray dried powder | 0.0227 | 7,604.5 |
| Corn starch, U.S.P | 0.0629 | 21,071.5 |
| Calcium carbonate, heavy U.S.P | 0.0879 | 29,446.5 |
| Talc, U.S.P | 0.0015 | 502.5 |

These ingredients are filled into a clean, dry 55 gallon drum which is sealed and rolled for 5 hours, or until a uniform mixture is obtained. After assaying it is ready for capsulation.

The batch was filled into soft gelatin capsules on a commercial high speed capsulating machine of the type described in Stirn and Taylor U. S. Patent No. 2,775,084. The capsules were filled satisfactorily and contained the required dosage.

Example 4

Following the procedure of Example 3, capsules containing 50 mg. of sodium di-n-octyl sulfosuccinate per 150 mg. dose were prepared from the following powder mix:

|  | Grams/Dose | Standard Batch, Grams |
|---|---|---|
| Sodium di-n-octyl sulfosuccinate 90%, Sodium benzoate 10%—Spray dried powder | 0.0571 | 15,702.5 |
| Corn starch, U.S.P | 0.0457 | 12,567.5 |
| Calcium carbonate, heavy U.S.P | 0.0457 | 12,567.5 |
| Talc, U.S.P | 0.0015 | 412.5 |

Example 5

A solution of 88.8 grams (0.2 mole) of sodium di-(normal octyl) sulfosuccinate in ethanol was prepared and the free acid was liberated by slowly adding an equivalent quantity of sulfuric acid. The precipitated sodium sulfate was removed by filtration.

One-half of the filtrate was neutralized by adding aqueous ammonium hydroxide. The other half was neutralized by adding monoethanolamine. The resulting alcoholic solutions were evaporated to dryness, thus producing the ammonium and monoethanolamine salts of di-n-octyl sulfosuccinic acid in solid form. These solids were chilled in a Dry Ice cabinet and ground in admixture with Dry Ice as described in Example 2. Both products ground easily to white, free-flowing powders which were mixed with a taste-free carrier in the following proportions:

|  | Grams per Tablet | Grams per Batch |
|---|---|---|
| Ammonium or Monoethanolamine di-n-octyl Sulfosuccinate (100%) | 0.510 | 10.3 |
| Dicalcium phosphate, blank granulation | 0.1123 | 22.5 |
| Magnesium stearate | 0.0017 | 0.34 |

The two mixtures were rolled in jars for 15 minutes; they were then inspected and found to be well mixed and free-flowing. They were compressed without difficulty into well-formed tablets weighing 165 milligrams each on a tabletting machine.

What we claim is:

1. A laxative composition suitable for rapid and accurate measuring and packaging on automatic machines in dosage unit form consisting essentially of a uniform powdered mixture of a di-(normal octyl) sulfosuccinate salt selected from the group consisting of alkali metal, ammonium and monoethanolamine salts and a dry pharmaceutical carrier in a ratio of from 1 to about 25 parts by weight of said carrier for each part of said sulfosuccinate salt.

2. A laxative composition suitable for rapid and accurate measuring and packaging on automatic machines in dosage unit form consisting essentially of a uniform powdered mixture of sodium di-(normal octyl) sulfosuccinate and a dry pharmaceutical carrier in a ratio of from about 1 to about 25 parts by weight of said carrier for each part of said sulfosuccinate salt.

3. A laxative composition suitable for tabletting on an automatic tabletting machine consisting essentially of a uniform powdered mixture of a di-(normal octyl) sulfosuccinate salt selected from the group consisting of alkali metal, ammonium and monoethanolamine salts and a granulated pharmaceutical carrier including dicalcium phosphate, the weight ratio of said carrier to said sulfosuccinate salt being from 1:1 to 25:1.

4. A laxative composition suitable for rapid and accurate measuring and tabletting on automatic machines in dosage unit form consisting essentially of a uniform powdered mixture of sodium di-(normal octyl) sulfosuccinate and a granulated pharmaceutical carrier including dicalcium phosphate, the weight ratio of said carrier to said sulfosuccinate salt being from 1:1 to 25:1.

5. A compressed tablet suitable for oral administration as a laxative containing a measured dose of a member of the group consisting of alkali metal, ammonium and monoethanolamine salts of di-(normal octyl) sulfosuccinic acid in uniform admixture with from 1 to about 25 times its weight of a dry pharmaceutical carrier.

6. A compressed tablet suitable for oral administration as a laxative containing a measured dose of sodium di-(normal octyl) sulfosuccinate in uniform admixture with from 1 to about 25 times its weight of a dry pharmaceutical carrier.

7. A method for producing a di-(normal octyl) sulfosuccinate salt selected from the group consisting of alkali metal, ammonium and monoethanolamine salts in a dry, powdered form suitable for dry mixture with a pharmaceutical carrier which comprises mixing said salt in dry, solid form with solid carbon dioxide and grinding the mixture.

References Cited in the file of this patent

UNITED STATES PATENTS

| 226,057 | Gerner | Mar. 30, 1880 |
| 1,630,985 | Tival | May 31, 1927 |
| 1,924,059 | Hoskins | Aug. 22, 1933 |
| 2,583,697 | Hendry | Jan. 29, 1952 |
| 2,847,346 | Vaughan | Aug. 12, 1958 |

OTHER REFERENCES

J. A. M. A., vol. 158, No. 4, May 28, 1955, pp. 261–263.

Modern Drugs, March 1956, p. 609.

J. A. P. A., Pract. Pharm. Ed., vol. 18, No. 1, January 1957, p. 61.

Remington's Practice of Pharmacy, 11th ed., Mack Publ. Co., p. 385 (dicalcium phosphate with vitamin D tablets).